(No Model.)
W. REILLY & C. HAIGH.
TWO SPEED DRIVING GEAR FOR BICYCLES.
No. 588,657. Patented Aug. 24, 1897.
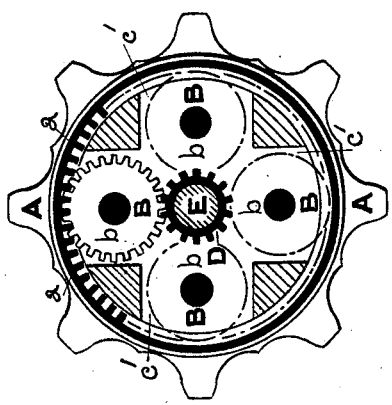
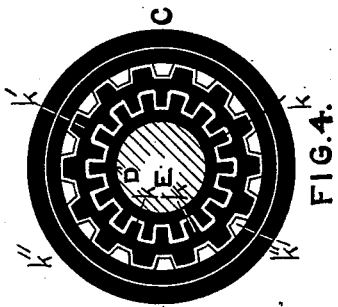
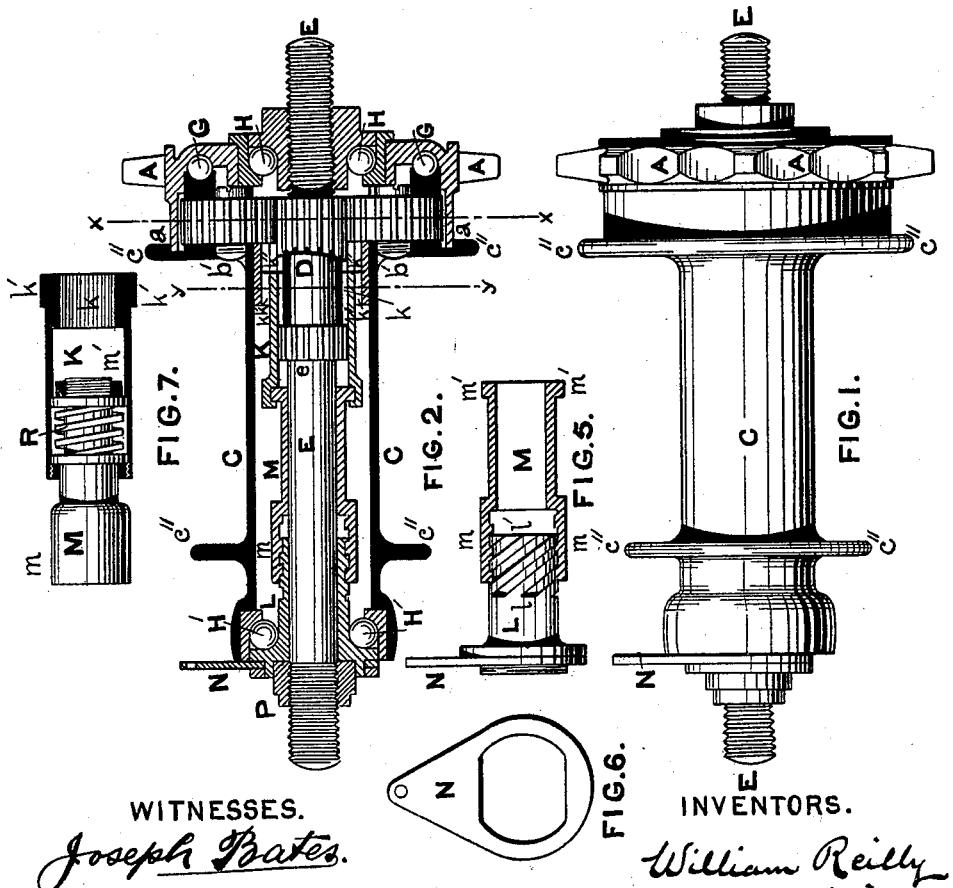
WITNESSES.
Joseph Bates.
E. Howard.
INVENTORS.
William Reilly
Charlton Haigh
by Wm. P. Thompson & Co.
attys.
THE NORRIS PETERS CO., PHOTO-LITHO., WASHINGTON, D. C.

UNITED STATES PATENT OFFICE.

WILLIAM REILLY, OF SALFORD, AND CHARLTON HAIGH, OF MANCHESTER, ENGLAND.

TWO-SPEED DRIVING-GEAR FOR BICYCLES.

SPECIFICATION forming part of Letters Patent No. 588,657, dated August 24, 1897.

Application filed December 29, 1896. Serial No. 617,426. (No model.)

*To all whom it may concern:*

Be it known that we, WILLIAM REILLY, residing at Salford, and CHARLTON HAIGH, residing at Chorlton-on-the-Medlock, Manchester, in the county of Lancaster, England, subjects of the Queen of Great Britain, have invented certain new and useful Improvements in Two-Speed Driving-Gear for Bicycles and other Vehicles, of which the following is a specification.

This invention relates to driving-gear for bicycles and other vehicles in which epicyclic gearing is employed to change from one speed to another while in motion. In order to change the speed, it is necessary to disengage or disconnect the internal wheel or pinion from one part of the mechanism and connect it to or engage it with another part of the mechanism. Various arrangements and devices have hitherto been designed for this purpose; but these we consider clumsy, complicated, and expensive and not well adapted for the purpose.

Our invention is designed to provide a simple and effective mechanism for throwing into and out of gear the operative parts of the apparatus and also to improve the construction of the wheel-hub, so as to reduce the number of parts thereof.

It consists, essentially, in the combination, with epicyclic driving-gear comprising internally-toothed sprocket-wheel gearing with one, two, or more pinions around a central pinion on the wheel axle or spindle, of a movable slide formed with teeth or projections capable of being moved to and fro on the spindle to connect or lock the central spindle with the hub when in one position and with the fixed spindle when in the reverse position.

The gearing is constructed with a sprocket or driving wheel A, provided with internal teeth $a$, which gear with one, two, or more, preferably four, small pinions B. The pinions B rotate on studs $b$, attached to the end $c$ of the hub C, and gear with a pinion D, which rotates loosely on the spindle E. At the driving end the hub C is formed with a shoulder or enlargement $c$, and in this shoulder we form, by cutting or otherwise, slots or recesses $c'$ to receive the pinion-wheels B. The slots $c'$ are cut right through at intervals, so that when the wheels B are placed therein they extend outward to engage the internal teeth $a$ of the wheel A and inward to engage the pinion D on the wheel-spindle E. Other holes $b'$ are drilled or bored and studs $b$ passed through, on which the pinions B rotate.

The internally-toothed wheel $a$ is attached to and forms part of the sprocket-wheel A and is placed over the end of the hub, a journal being formed with balls G and H, upon which it rotates. The end $c$ of the hub C may be faced with a steel or other strip or ring, if found desirable. The spoke-flange $c''$ projects from this enlargement of the boss.

Figure 1 is a side elevation; Fig. 2, longitudinal section; Fig. 3, transverse section on line $x$ $x$, Fig. 2; Fig. 4, transverse section on line $y$ $y$, Fig. 2; Fig. 5, side elevation of the movable slide with actuating device; Fig. 6, end elevation of same; Fig. 7, modification of the slides M and K.

The central pinion D is placed upon the axle E and is free to rotate thereon, but has no longitudinal movement. On the axle E we also place a slide or sleeve K, capable of being slid or moved to and fro thereon, fitted or provided internally with teeth $k$ and externally with teeth $k'$. The spindle E is provided with a fixed pinion $e$, either formed as part of the shaft or keyed to it, with teeth corresponding to the internal teeth $k$ of the slide K, with which these teeth can gear and over which the slide K moves.

The hub C is provided with internal teeth or projections $k''$, with which the external teeth $k'$ of the slide K can engage or lock. The internal teeth $k$ of the slide K are always in gear with the rotatable pinion D, so that when the slide K is moved in one direction it connects or locks the pinion D by means of the external teeth $k'$ and the hub-teeth $k''$ with the hub C, and when moved in the reverse direction it is connected or locked with the axle E by means of the internal teeth $k$ and the fixed pinion $e$.

At one end of the hub C we arrange the cone L, that supports the bearing-balls H', capable of rotating, but without any longitudinal movement, upon the axle E. The inner end $l$ of this cone we elongate to any desired distance to carry a quick-pitch screw $l'$, and on the inner end of the sleeve thus formed on the cone we cut a screw-thread, preferably square, say of about seven-eighths pitch and provided with about seven separate threads. The exact length of pitch and number of threads may of course be varied or altered to suit the length of travel required and the distance the cone is intended to be rotated. The cone L is held in position and adjusted by the nut P.

An intermediate slide M, which cannot rotate, is interposed between the end of the cone L and the slide K. The end $m$ of the slide M is provided with internal screw-threads corresponding with those on the end of the cone-sleeve L and the other end, $m'$, with a flange to engage with and draw back the slide K.

Instead of connecting the slide M and the toothed sleeve K direct, as shown in Fig. 1, the sleeve K may be made sufficiently long to allow of a spring R being interposed, as shown in Fig. 7.

At the outer end of the cone L is attached a plate or lever N of any convenient shape, to which a rod or the like is attached for the purpose of rotating it. At present we consider that the angular movement of the cone should be about one-fourth revolution.

In operation when the sleeve K is in the position shown and the pinion D locked to the spindle by reason of being in gear with the fixed pinion $e$ the speed of the hub is retarded and power is gained in driving more slowly. When a normal or quick speed is required, the sleeve K is moved by means of the lever N and cone-sleeve L until the external teeth gear with the teeth $k''$ of the hub C, thereby locking the pinion D with the hub C, so that the hub then rotates at the same speed as the driving or sprocket wheel A.

We wish it to be clearly understood that no claim is made for the epicyclic gearing *per se*.

What we claim as our invention, and desire to protect by Letters Patent, is—

1. The combination with epicyclic driving-gear for cycles and other vehicles of a wheel-hub provided with internally-projecting teeth, a stationary axle with a fixed pinion thereon and a sliding sleeve with both external and internal teeth which slides to and fro on the axle and alternately locks the central pinion with the fixed pinion to retard the speed and with the teeth projecting from the interior of the hub.

2. In epicyclic driving-gear for cycles and other vehicles the combination with the central pinion and with the hub provided with internal teeth of a sliding sleeve gearing therewith provided with both internal and external teeth by which the central pinion can be alternately locked with a fixed part of the cycle or with a rotating part to vary the speed substantially as described.

3. An epicyclic driving-gear for cycles and other vehicles comprising a sprocket driving-wheel A provided with internal teeth planetary pinions B rotating on studs $b$ affixed to the end of the hub C and central rotating pinion D on the axle E in combination with the hub C provided with internally-projecting teeth $k''$ the axle E and fixed pinion $e$ and the sleeve K capable of sliding to and fro on the axle fitted internally with teeth which engage with the pinions D and $e$ to lock the pinion D to the axle and fitted externally with teeth which engage with the teeth $k''$ of the hub C to lock the pinion D to the hub for the purpose of varying the speed of driving substantially as described.

4. The combination of epicyclic driving-gear for the wheels of cycles and other vehicles of the hub C provided with internally-projecting teeth $k''$ the stationary axle E about which the wheels rotate the pinion $e$ affixed to the said axle the sleeve K placed on the axle capable of sliding to and fro thereon and provided with external teeth $k'$ and internal teeth $k$ the internal teeth $k'$ of which gear with the pinions D and $e$ and the external teeth $k$ with the hub-teeth $k''$ the revolving cone at the end of the shaft for shifting the sleeve K provided with quick screw-threads the intermediate connecting-sleeve M which engages with the screw of the cone at one end and with the sleeve K at the other and the lever N by which the cone is rotated substantially as described.

In testimony whereof we have signed our names to this specification in the presence of two subscribing witnesses.

WILLIAM REILLY.
CHARLTON HAIGH.

Witnesses:
J. OWDEN O'BRIEN,
HARRY BARNFATHER.